United States Patent
Hayashi

(10) Patent No.: US 11,316,989 B2
(45) Date of Patent: Apr. 26, 2022

(54) PROCESSING SYSTEM AND NON-TRANSITORY COMPUTER READABLE MEDIUM FOR CONTROLLING EXECUTION OF REGISTRATION PROCESS ON IMAGE PROCESSING APPARATUS

(71) Applicant: FUJIFILM Business Innovation Corp., Tokyo (JP)

(72) Inventor: Koji Hayashi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 181 days.

(21) Appl. No.: 16/566,901

(22) Filed: Sep. 11, 2019

(65) Prior Publication Data
US 2020/0099802 A1 Mar. 26, 2020

(30) Foreign Application Priority Data
Sep. 20, 2018 (JP) .............................. JP2018-176049

(51) Int. Cl.
H04N 1/00 (2006.01)

(52) U.S. Cl.
CPC ..... *H04N 1/00411* (2013.01); *H04N 1/00413* (2013.01); *H04N 1/00482* (2013.01); *H04N 1/00503* (2013.01)

(58) Field of Classification Search
CPC .......... H04N 1/00411; H04N 1/00413; H04N 1/00482; H04N 1/00503; H04N 1/4413; H04N 1/00477
See application file for complete search history.

(56) References Cited

U.S. PATENT DOCUMENTS

| | | | | |
|---|---|---|---|---|
| 8,341,734 B1* | 12/2012 | Hernacki | ................ | G06F 16/24 726/21 |
| 2007/0124516 A1* | 5/2007 | Ohara | ................... | H04N 1/4433 710/62 |
| 2018/0293034 A1* | 10/2018 | Uchida | ................. | G06F 3/1231 |
| 2018/0376015 A1* | 12/2018 | Hokiyama | ......... | H04N 1/00411 |

FOREIGN PATENT DOCUMENTS

JP 2017-202577 11/2017

\* cited by examiner

*Primary Examiner* — Juan M Guillermety
(74) *Attorney, Agent, or Firm* — JCIPRNET

(57) ABSTRACT

A processing system includes a detecting unit that detects an operator operation to set a recording medium onto an image processing apparatus or to move part of the image processing apparatus wherein the operator operation is an operation performed by an operator, and a controller that registers a registration processes and performs, in response to detected operator operation, a registration process among registration processes registered in advance wherein if one or more of the registration processes satisfy a predetermined condition, the controller registers the one or more of the registration processes which are changed not to perform in response to the operator operation or to perform the one or more of the registration processes after performing a particular process.

13 Claims, 8 Drawing Sheets

PROCESSING SYSTEM AND NON-TRANSITORY COMPUTER READABLE MEDIUM FOR CONTROLLING EXECUTION OF REGISTRATION PROCESS ON IMAGE PROCESSING APPARATUS

CROSS-REFERENCE TO RELATED APPLICATIONS

This application is based on and claims priority under 35 USC 119 from Japanese Patent Application No. 2018-176049 filed Sep. 20, 2018.

BACKGROUND

(i) Technical Field

The present disclosure relates to a processing system and a non-transitory computer readable medium.

(ii) Related Art

Japanese Unexamined Patent Application Publication No. 2017-202577 discloses a process that displays an application software screen responsive to a user identified by identification information that is received by an input unit when a detector detects an event.

An operator operation as an operation to be performed by the operator may be associated with a registration process that is registered in advance, and the registration process may be performed in response to the operator operation. In this configuration, the operator may perform the registration process without performing a selection operation of the registration process, and user friendliness is thus enhanced. On the other hand, the registration process is likely to be performed even though the operator does not intend to perform the registration process.

SUMMARY

Aspects of non-limiting embodiments of the present disclosure relate to controlling more the execution of a registration process registered in advance when an operator does not actually intend to perform the registration process than when the registration process is uniformly performed in response to an operator operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a processing system. A processing system includes a detecting unit that detects an operator operation to set a recording medium onto an image processing apparatus or to move part of the image processing apparatus wherein the operator operation is an operation performed by an operator, and a controller that registers a registration processes and performs, in response to detected operator operation, a registration process among registration processes registered in advance wherein if one or more of the registration processes satisfy a predetermined condition, the controller registers the one or more of the registration processes which are changed not to perform in response to the operator operation or to perform the one or more of the registration processes after performing a particular process.

BRIEF DESCRIPTION OF THE DRAWINGS

Exemplary embodiment of the present disclosure will be described in detail based on the following figures, wherein.

DETAILED DESCRIPTION

Exemplary embodiment of the disclosure is described in connection with the drawings.

Figure 1:
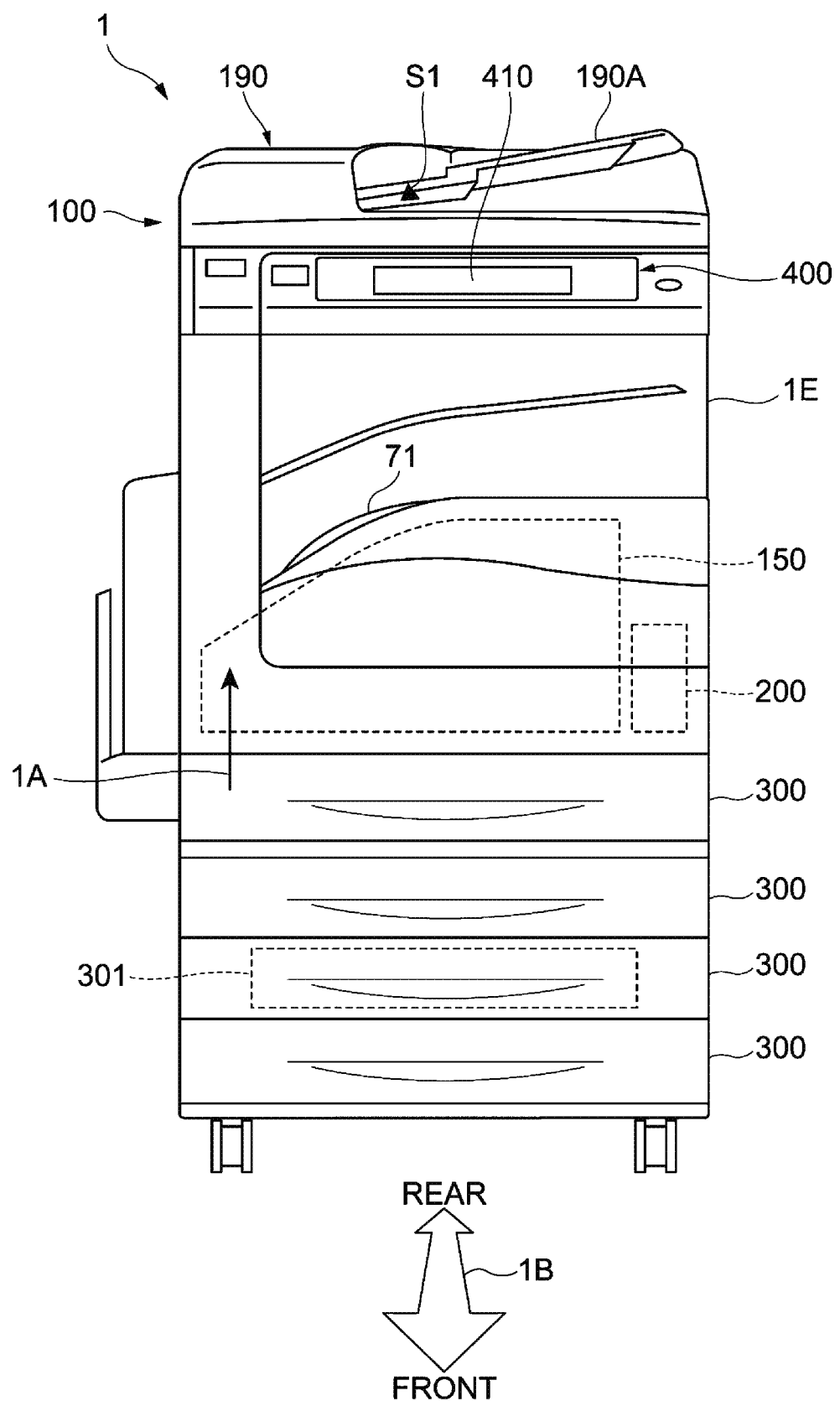
FIG. 1 is a front view of an image forming apparatus.

FIG. 1 is a front view of an image forming apparatus 1.

The image forming apparatus 1 as an example of an image processing apparatus includes an apparatus body 1E. An image reading device 100 that reads an image of an original document is mounted on the apparatus body 1E.

The image forming apparatus 1 also includes an image forming unit 150 that forms an image on a paper sheet. The image forming apparatus 1 further includes a controller 200 that controls functions of the image forming apparatus 1.

The image forming apparatus 1 further includes multiple paper sheet trays 300. The paper sheet tray 300 contains paper sheets that are transported to the image forming unit 150.

The image forming apparatus 1 further includes an operation receiving unit 400 that receives an instruction from an operator. The operation receiving unit 400 includes a display 410 including a touch panel.

The image forming apparatus 1 includes a processing system including multiple function units, such as the controller 200 and the display 410. The processing system performs a process described below.

The image reading device 100 includes an image reading unit (not illustrated) that reads an image formed on an original document (not illustrated). The image reading unit uses an image sensor, such as a charged coupled device (CCD), and reads the image formed on the original document.

In the exemplary embodiment, an original document transporting device 190 that transports an original document to an image reading location of the image reading unit is also included in the image forming apparatus 1.

An original document as an example of a recording medium is placed (set) on a location indicated by a reference number 190A of the original document transporting device 190. The original document transporting device 190 transports the sheets of the original document one by one to the image reading location.

The image reading device 100 includes an original document sensor S1.

The original document sensor S1 as an example of a detecting unit detects the setting of the original document on the image reading device 100. In other words, the original document sensor S1 detects the setting of the original document, serving as an example of an operator operation.

The original document transporting device 190 is pivotally rotatable around a rear end edge (deepest end portion in the direction perpendicular to the page of FIG. 1) of the image forming apparatus 1.

When the operator raises the front end of the original document transporting device 190, the original document transporting device 190 is pivoted upwardly. A document platen manufactured of transparent glass thus appears.

When the original document transporting device 190 is not used (when an original document on the document platen is read), the original document is placed on the document platen.

The image forming unit 150 as an example of an image forming unit forms an image on a paper sheet through an electrophotographic system. The system for image forming is not limited to the electrophotographic system, and may be another system, such as an ink-jet system.

In the image forming by the image forming unit 150, paper sheets are picked up and then transported from one of the paper sheet trays 300, and then fed to the image forming unit 150 as indicated by an arrow mark 1A.

When the image forming unit 150 has formed images on paper sheets, the paper sheets with the images formed thereon are stacked on a paper sheet discharge tray 71.

Each paper sheet tray 300 has a pull handle 301. To replenish the paper sheet tray 300 with paper sheets, the operator holds the pull handle 301 to withdraw the paper sheet tray 300 in one direction labeled an arrow mark 1B. When the paper sheet tray 300 is replenished with the paper sheets, the paper sheet tray 300 is pushed in the direction opposite to the one direction (is pushed into the rear side of the image forming apparatus 1) to the original position thereof.

Figure 2:
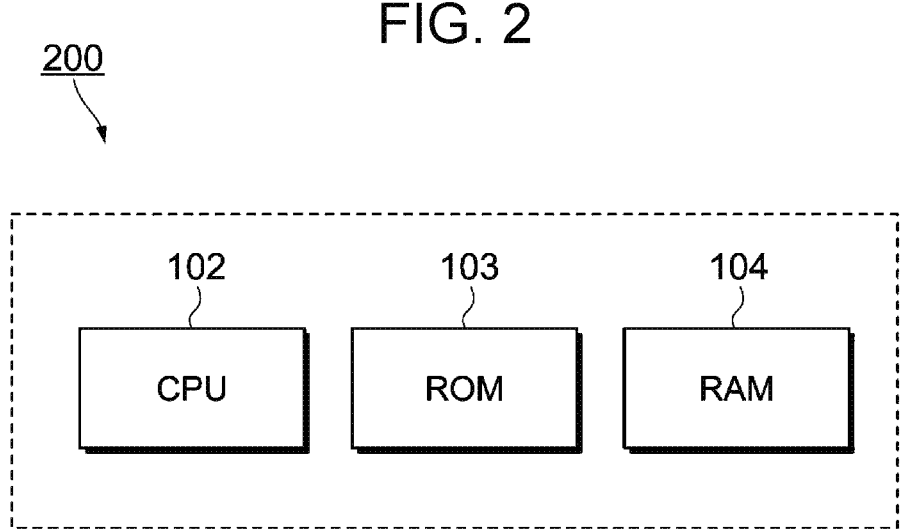
FIG. 2 illustrates a hardware configuration of a controller.

FIG. 2 illustrates a hardware configuration of the controller 200.

The controller 200 includes a central processing unit (CPU) 102, a read-only memory (ROM) 103, and a random-access memory (RAM) 104.

The ROM 103 stores a control program that is to be executed by the CPU 102. The CPU 102 reads the control program stored on the ROM 103, and executes the control program using the RAM 104 as a working area.

The CPU 102 controls function units of the image forming apparatus 1 by executing the control program.

The program executed by the CPU 102 may be provided to the image forming apparatus 1 in the recorded form on a computer readable recording medium. Such recording media include a magnetic recording medium (such as a magnetic tape, or a magnetic disk), an optical recording medium (such as an optical disk), a magneto-optical recording medium and a semiconductor memory.

The program to be executed by the CPU 102 may be downloaded to the image forming apparatus 1 via a communication system, such as the Internet.

Figure 3:
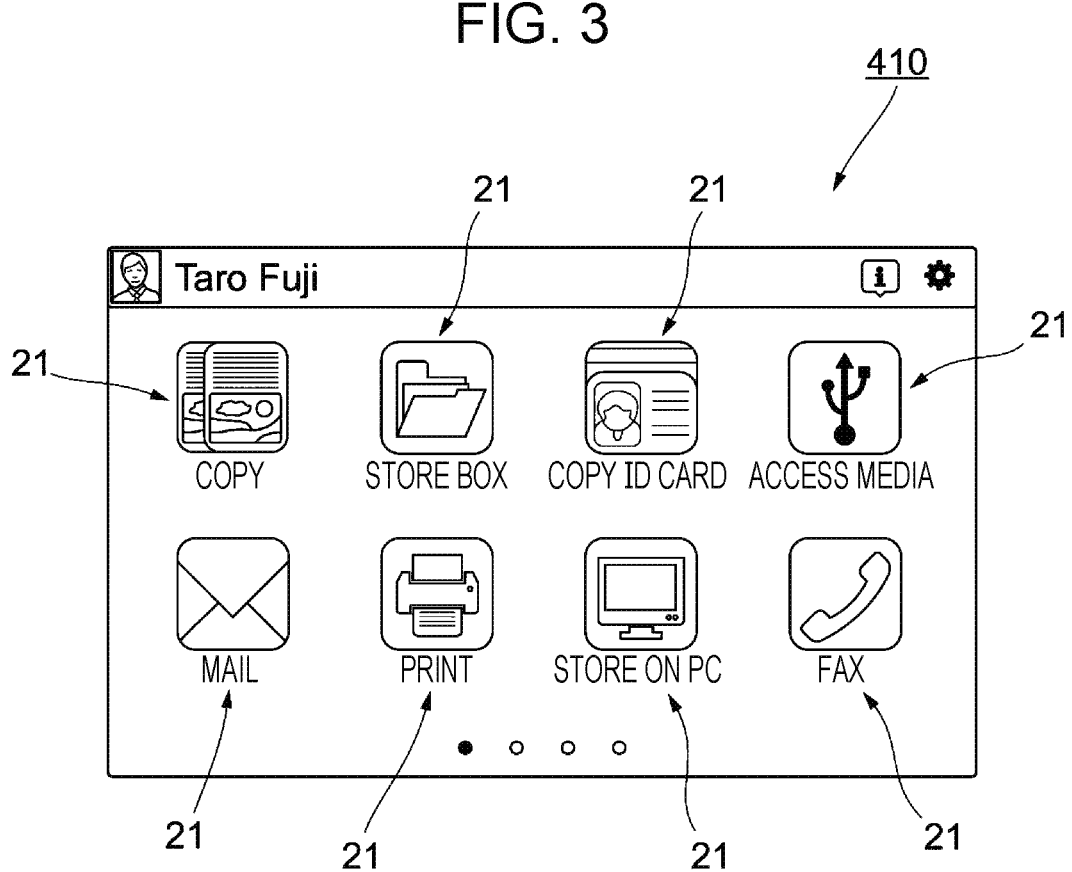
FIG. 3 illustrates a display example on a display.

FIG. 3 illustrates a display example on the display 410.

A home screen of FIG. 3 is normally displayed on the display 410.

Multiple selection buttons (icons) 21 are displayed on the home screen. When one of the selection buttons 21 is selected (pressed) by a user, a process associated with the corresponding selection button 21 is performed.

The selection buttons 21 for selecting "copy," "store box," "copy ID card," "access media," "mail," "print," "store on PC," and "fax" are displayed as illustrated in FIG. 3.

According to the exemplary embodiment, when the user selects one of the selection buttons 21, a screen for detailed settings is further displayed. If the user presses a predetermined button, such as a start button, a process, such as copy, starts.

In the image forming apparatus 1 of the exemplary embodiment, the user may create a new button 21 in addition to the existing selection buttons 21.

More specifically, according to the exemplary embodiment, a one-touch selection button 21 is created as a selection button 21 that starts executing a process without entering a detailed setting each time.

Performing a single operation on a display screen (touch panel) creates the one-touch selection button 21 that permits the process to be started and then carried out until the end of the process.

According to the exemplary embodiment, the operator may register a process having contents desired by the operator. To register the process, the operator creates the one-touch selection button 21 by associating it with a desired process. The one-touch selection button 21 thus created is displayed on the display 410.

When the one-touch selection button 21 displayed on the display 410 is selected in the exemplary embodiment, the process registered in association with the selection button 21 (hereinafter referred to as a "registration process") is performed.

Figure 4A:
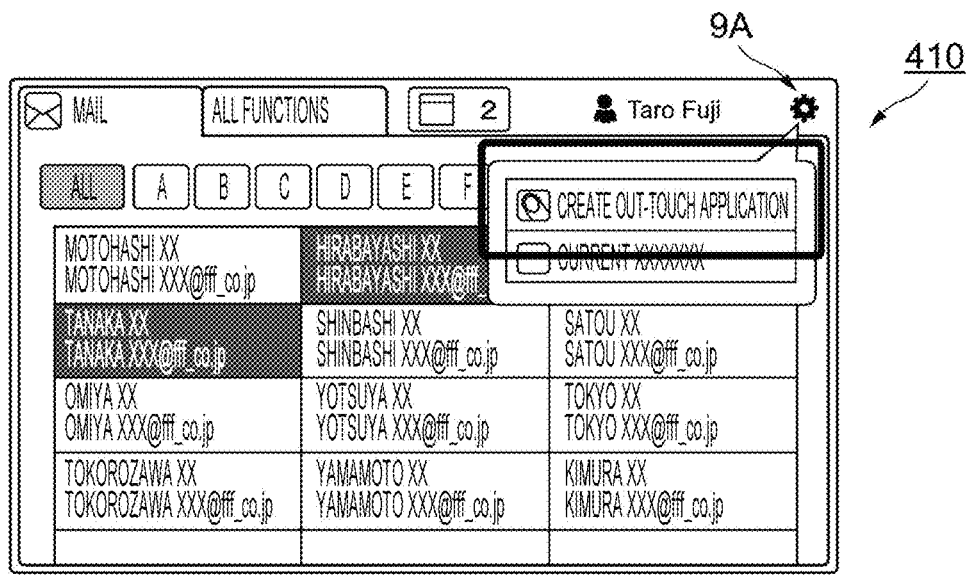
FIGS. 4A through 4C illustrate display screens when a one-touch selection button is created.

In order to create the one-touch selection button 21 (to register the registration process), the operator selects a gear-like symbol (labeled number 9A) at the top right corner of the screen of FIG. 4A (illustrating the display screen when the one-touch selection button 21 is created). This triggers a transition to the display screen of FIG. 4B.

Figure 4B:
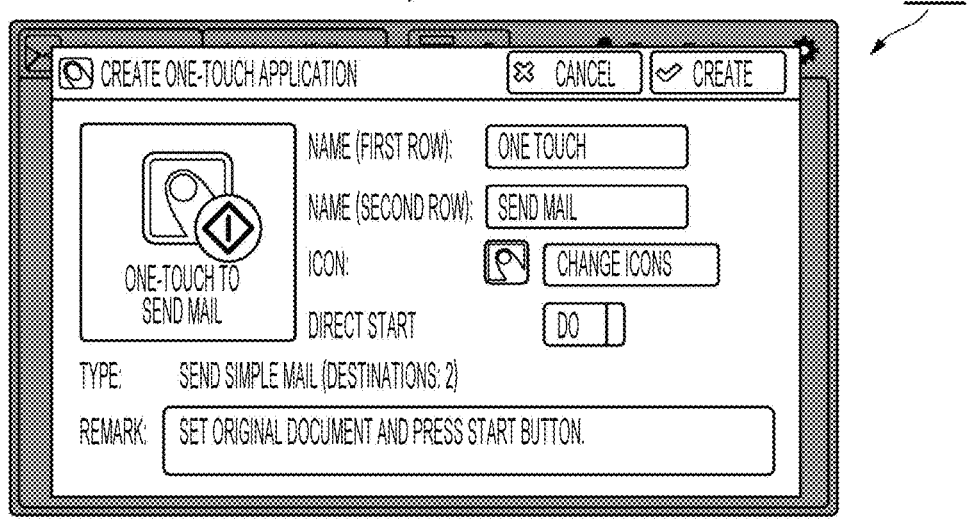

On the display screen of FIG. 4B, the user enters information used to create the one-touch selection button 21 (used to execute the registration process). The display screens of FIGS. 4A and 4B are used to create the one-touch selection button 21 for sending a mail. On the display screens, the user enters information, such as a destination and a transmission method.

Upon completing the entry on the display screens of FIGS. 4A and 4B, the user may press a button "create" at the top right corner of the display screen.

Figure 4C:
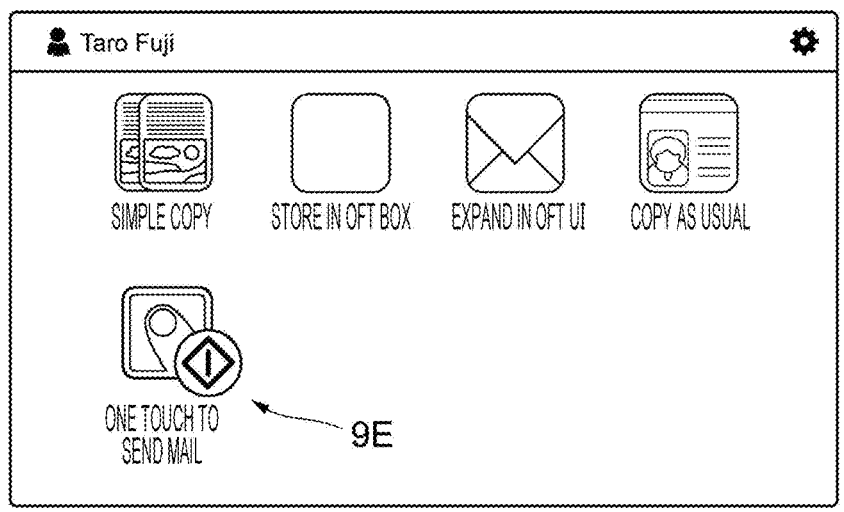

In this way, the display transitions to the display screen of FIG. 4C. A one-touch selection button 21 "one-touch to send mail" is newly created as indicated by reference numeral 9E on the display screen.

According to the exemplary embodiment, the registration process of mail transmission is registered in association with the one-touch selection button 21.

According to the exemplary embodiment, the registration processes that are enabled to be associated with the one-touch selection button 21 includes a registration process that is to be immediately performed (hereinafter referred to as an immediate-type registration process) and a registration process that is to be confirmed (hereinafter referred to as a confirmation-type registration process).

Once the one-touch selection button 21 is selected, the immediate-type registration process advances to the completion thereof without any additional input operation by the operator.

Once the one-touch selection button 21 is selected, the confirmation-type registration process displays a screen indicating process contents of the registration process, and starts to execute itself if the operator enters a further instruction (if a reply is returned from the operator).

According to the exemplary embodiment, the operator operation performed by the operator is associated with the registration process (the immediate-type registration process or the confirmation-type registration process).

According to the exemplary embodiment, when the operator performs the operator operation, the registration process registered in association with the operator operation is performed.

In such a case, the registration process is performed without a selection operation of the one-touch selection button 21.

Specifically, according to the exemplary embodiment, the operator operation is detected using a sensor or the like. When the operator operation is detected, the registration process registered in association with the operator operation is performed. In this case, the registration process is performed without selecting the one-touch selection button 21.

More specifically, the operator operation of setting an original document on the image reading device 100 may be associated with the registration process. If the setting of the original document onto the image reading device 100 is detected by the original document sensor S1 (see FIG. 1), the registration process is performed.

In the exemplary embodiment, the operator operation of setting the original document onto the image reading device 100 is detected, the registration process is performed. The operator operation is not limited to the setting of the original document.

For example, the registration process may be performed when the operator operation of moving part of the image forming apparatus 1, such as an operation of drawing the paper sheet tray 300 (see FIG. 1) or an operation of pivoting the original document transporting device 190 upward, is detected.

If an attempt to perform the registration process is made in response to the operator operation without any restriction, the registration process may be performed though the operator does not intend to perform the registration process.

For example, if the operator sets an original document on the image reading device 100, the registration process may be performed uniformly. Although the operator does not intend so, the registration process may be performed.

As described below, the controller 200 of the exemplary embodiment performs control such that one or more of the registration processes is not performed in response to the operator operation.

Specifically, the controller 200 does not perform the registration process in response to the operator operation by not associating the operator operation with the one or more of the registration processes or by restricting the execution of the one or more of the registration processes.

Alternatively, instead of performing the one or more of the registration processes in a way that accounts for the contents exactly registered, the controller 200 performs the one or more of the registration processes after performing a particular process.

Figure 5:
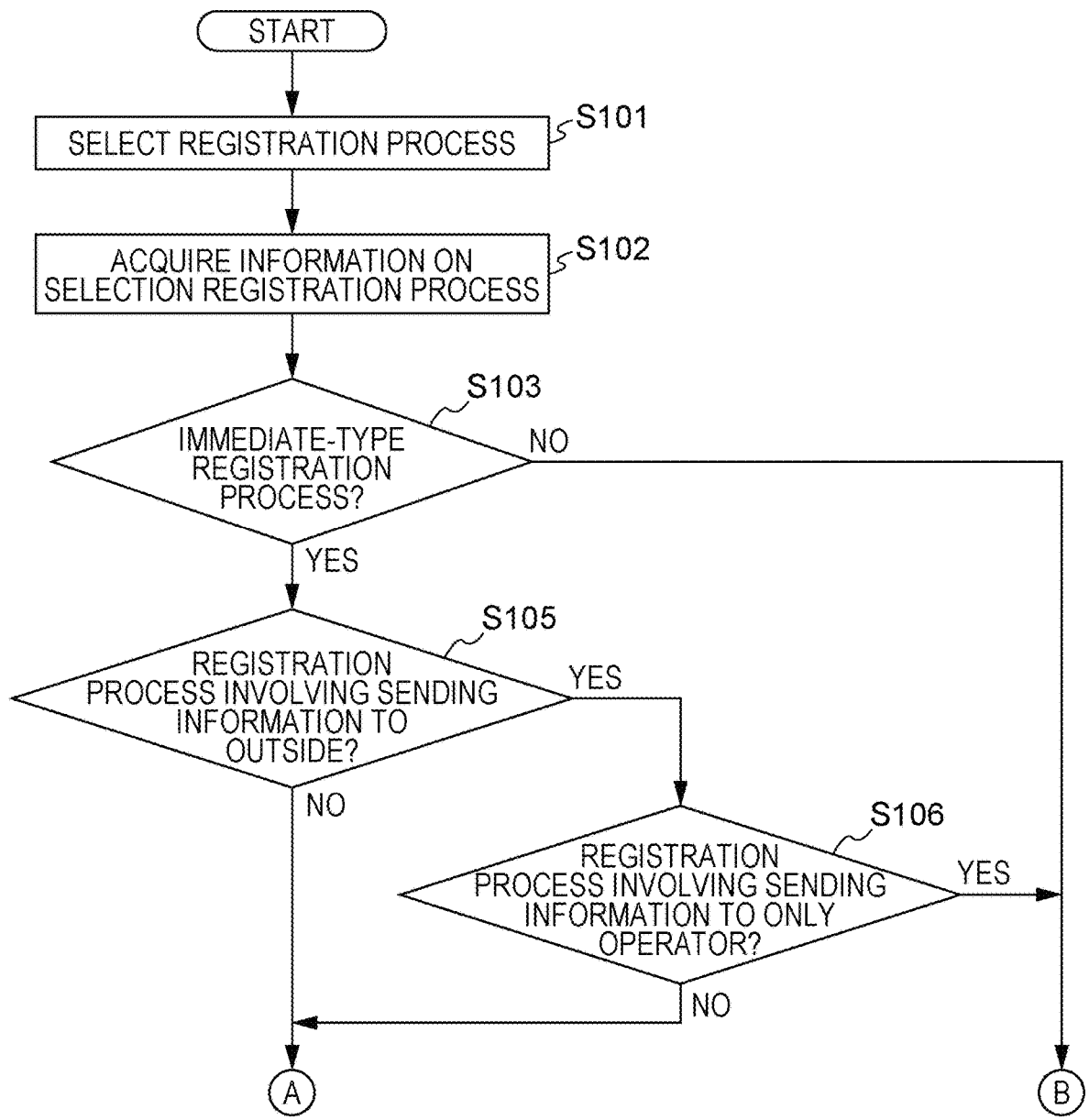
FIG. 5 is a flowchart illustrating a process that is performed when an operator operation is associated with a registration process.
Figure 6:
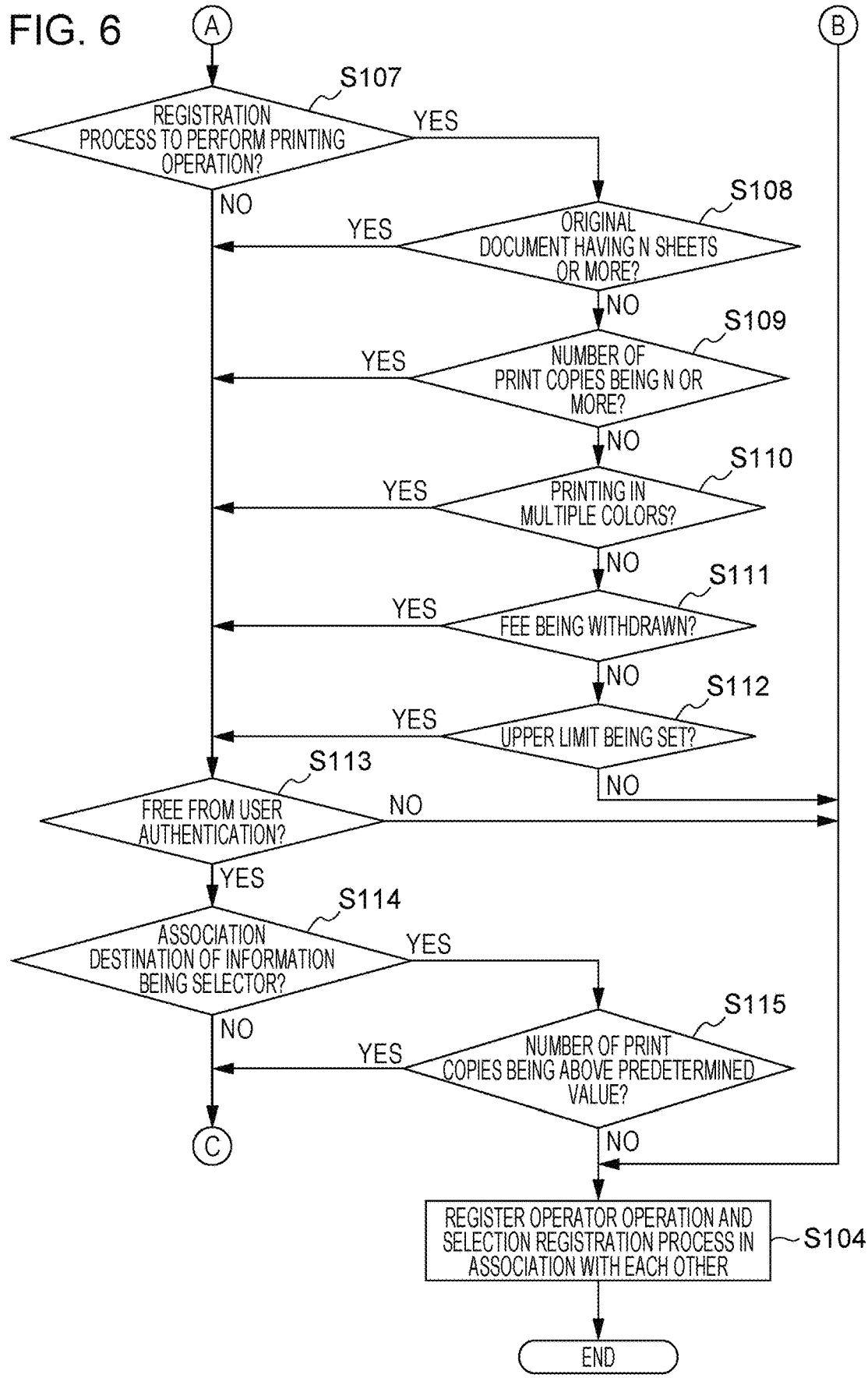
FIG. 6 is a flowchart illustrating the process that is performed when the operator operation is associated with the registration process.
Figure 7:
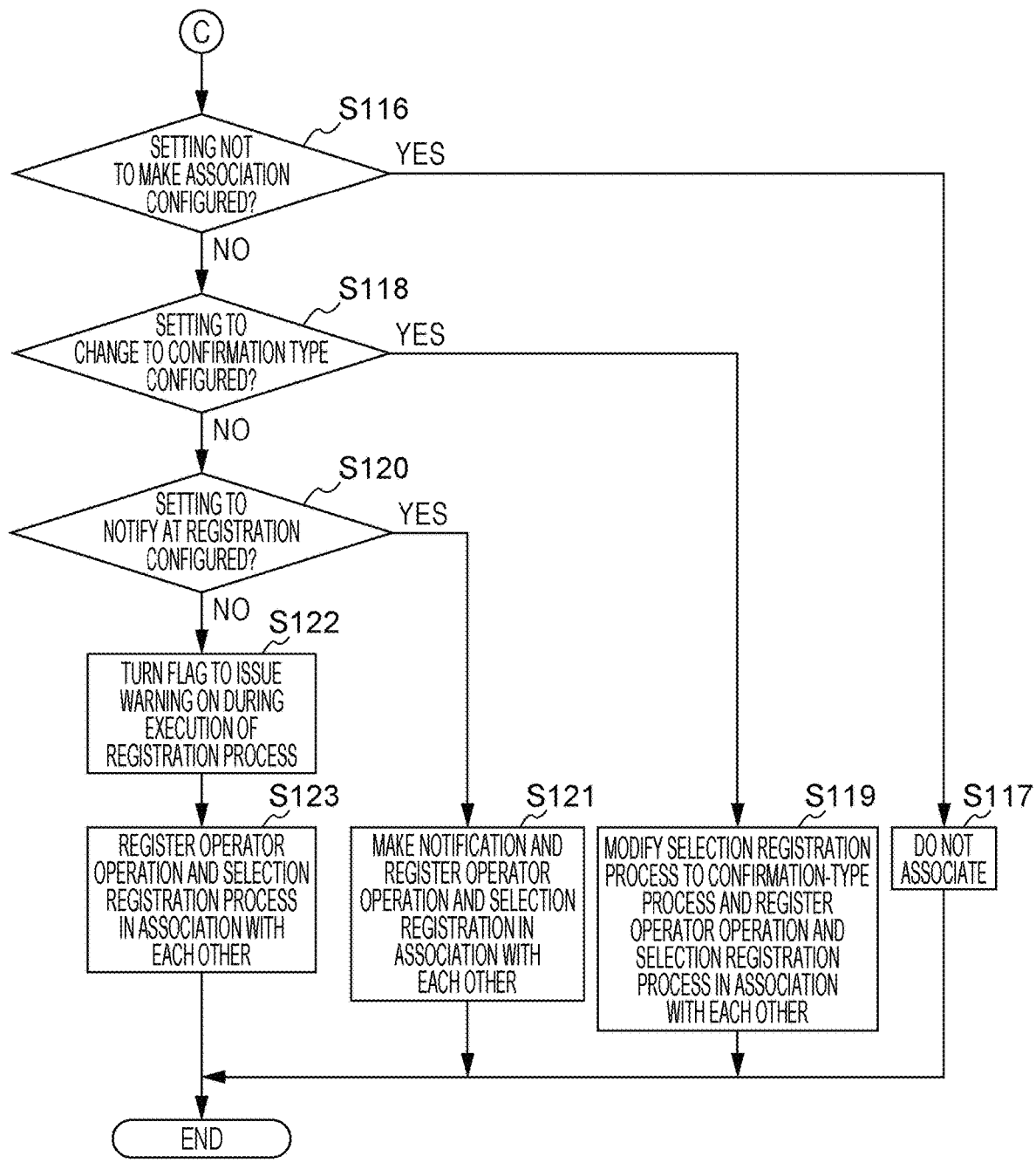
FIG. 7 is a flowchart illustrating the process that is performed when the operator operation is associated with the registration process.

FIGS. 5 through 7 are flowcharts illustrating a process performed when the operator operation is associated with the registration process.

Specifically, FIGS. 5 through 7 illustrates the process performed when the operator operation of setting an original document onto the image reading device 100 is associated with the registration process.

In the process, the operator first selects a registration process that is to be associated with the operator operation, from among multiple registration processes registered in advance (step S101).

In other words, the operator selecting a registration process selects the registration process that is to be associated with the operator operation, from the multiple registration processes.

The controller 200 acquires information on the selected registration process (hereinafter referred to as a "selection registration process") (step S102).

Specifically, the controller 200 acquires the process contents of the selection registration process, and information as to whether the selection registration process is an immediate-type registration process or a confirmation-type registration process.

The controller 200 determines whether the selection registration process is an immediate-type registration process (step S103).

If the controller 200 determines in step S103 that the selection registration process is not an immediate-type registration process (determines that the selection registration process is a confirmation-type registration process), the controller 200 registers the operator operation and the selection registration process in association with each other (step S104).

If the controller 200 determines in step S103 that the selection registration process is an immediate-type registration process, the controller 200 determines whether the selection registration process is a registration process involving sending information to outside (step S105).

If the controller 200 determines in step S105 that the selection registration process is the registration process involving sending the information to outside, the controller 200 determines whether the selection registration process is a registration process involving sending information to the operator who operates the image forming apparatus 1 (step S106).

More specifically, the controller 200 determines in step S106 whether the destination of the information to be sent in the selection registration process is only the operator who has selected the selection registration process in step S101.

In other words, the controller 200 determines whether the destination of the information to be sent in the selection registration process matches the selector who has selected the selection registration process in step S101.

If the controller 200 determines in step S106 that the destination of the information to be sent in the selection registration process is only the selector who has selected the selection registration process, the controller 200 proceeds to an operation in step S104, and registers the operator operation and the selection registration process in association with each other.

According to the exemplary embodiment, the operator (the selector who has selected the selection registration process) performs user authentication prior to an operation of the image forming apparatus 1. The image forming apparatus 1 thus acquires operator information (selector information) identifying the operator, such as the name of the operator (selector).

A determination as to whether the destination of the information to be sent in the selection registration process is only the selector who has selected the selection registration process is made by comparing information on a destination associated with the selection registration process with the operator information acquired through the user authentication.

If a person identified by the information on the destination matches a person identified by the operator information acquired through the user authentication, the destination of the information to be sent in the selection registration process is determined to be only the selector who has selected the selection registration process.

If the destination of the information to be sent in the selection registration process is different from the selector, the information may be sent to a third person different from the selector.

According to the exemplary embodiment, the destination of the information to be sent in the selection registration process is different from the selector, an association operation in step S104 (association of the operator operation with the selection registration process) is not performed, but step S107 and subsequent steps are performed.

If the controller 200 determines in step S105 that the selection registration process is not a registration process involving sending the information to outside, or determines in step S106 that the destination of the information to be sent in the selection registration process is different from the selector, the controller 200 proceeds to step S107.

The controller 200 determines in step S107 whether the selection registration process is a registration process to perform a printing operation. If the controller 200 determines that the selection registration process is a registration process to perform a printing operation, the controller 200 proceeds to step S108 and subsequent steps to determine whether the selection registration process is a printing operation satisfying a predetermined print condition.

Specifically, the controller 200 determines whether the selection registration process is a registration process in which the number of sheets in an original document that is to be read by the image reading device 100 is N (predetermined number of sheets) or more (namely a registration process performing a printing operation after N or more sheets in the document is read) (step S108).

If the controller 200 determines that the selection registration process is not a registration process having the number of sheets in the original document being N or more, the controller 200 proceeds to step S109.

The controller 200 determines in step S109 whether the selection registration process is a registration process having the number of print copies being N or more. In other words, the controller 200 determines whether the selection registration process is a registration process that performs a printing operation of the number of print copies being above the predetermined value.

If the controller 200 determines that the selection registration process is not a registration process that performs a printing operation of the number of print copies being above the predetermined value, the controller 200 determines whether the selection registration process is a registration process to perform the printing operation in multiple colors (step S110)

If the controller 200 determines that the selection registration process is not a registration process that performs the printing operation in multiple colors, in other words, the controller 200 determines that the selection registration process is a registration process that performs the printing operation in monochrome, the controller 200 then determines whether the selection registration process is a registration process involving fee withdrawal (step S111).

Once the operator operation has been associated with the registration process involving the fee withdrawal, a corresponding fee is charged even with the operator operation not intending so if the operator has unintentionally performed the operator operation.

According to the exemplary embodiment, if the selection registration process is a registration process involving the fee withdrawal, the controller 200 proceeds to step S113 and subsequent steps (instead of proceeding to step S104) such that the operator operation is not associated with the selection registration process.

If the controller 200 determines in step S111 that the selection registration process is not a registration process involving the fee withdrawal, the controller 200 proceeds to step S112.

In step S112, the controller 200 determines whether the selection registration process is a registration process that has an upper limit on the number of print copies set, and is unable to perform the printing operation if the upper limit is exceeded (step S112).

If the controller 200 determines that the selection registration process is not a registration process with the upper limit on the number of print copies set, the controller 200 proceeds to step S104. The controller 200 registers operator operation and the selection registration process in association with each other.

If the selection registration process is a registration process that has the upper limit on the number of print copies set, and is unable to perform the printing operation if the upper limit is exceeded, there is a possibility that the printing operation is disabled against the operator's intention with the upper limit on the number of print copies exceeded.

According to the exemplary embodiment, the controller 200 proceeds to step S113 in the registration process with the upper limit of the number on print copies set, and the association with the operator operation is not configured.

If the controller 200 determines in step S107 that the selection registration process is not a registration process to perform the printing operation, or an affirmative answer results in one of steps S108 through S112, the controller 200 proceeds to step S113.

In step S113, the controller 200 determines whether the selection registration process is a registration process not involving the user authentication in the execution of the registration process (hereinafter referred to as an "authentication-free registration process").

If the controller 200 determines in step S113 that a registration process is not an authentication-free registration process, in other words, the controller 200 determines that the selection registration process is a registration process involving the user authentication, the controller 200 proceeds to step S104 and registers the operator operation and the selection registration process in association with each other.

On the other hand, if the controller 200 determines in step S113 that the selection registration process is an authentication-free registration process, the controller 200 proceeds to step S114.

The selection registration process may be a registration process involving the user authentication. If the registration process is performed in response to the operator operation, the operator having performed the operator operation causing the registration process to be performed is identified.

It will be noted that since the user authentication is performed before the execution of the registration process, the operator who has performed the operator operation triggering the registration process is identified.

The registration process may be unintentionally performed without the user authentication. (In other words, the operator performs an operation corresponding to the operator operation without the operator's knowing the registration process, and the registration process may be unintentionally performed.)

In such a case, without the user authentication, the person who has performed the registration process is unknown. It may be difficult to identify the person who has performed the registration process.

According to the exemplary embodiment, if the selection registration process is an authentication-free registration process, the operator operation is designed not to be associated with the selection registration process (the controller 200 proceeds to step S114 and subsequent steps). This reduces difficulty in identifying the person who has performed the registration process.

On the other hand, if the selection registration process is not an authentication-free registration process, the person who has performed the registration process is identified even if the registration process is unintentionally performed. The operator operation is thus associated with the registration process.

The user may perform the user authentication by holding the user's own identification (ID) card over the image forming apparatus 1 or entering a password (user code) onto the image forming apparatus 1 prior to starting the operator operation. In this way, the image forming apparatus 1 identifies the person who performs the operator operation.

In step S114, the controller 200 determines whether an association destination of the information on the selection registration process is the selector who has selected the selection registration process in step S101.

Specifically, the controller 200 determines whether the association destination of the information on the number of execution times of the selection registration process is the selector who has selected the selection registration process in step S101.

In other words, the controller 200 determines whether the association destination of the information on the selection registration process is the operator who operates the image forming apparatus 1.

If the controller 200 determines in step S114 that the association destination of the information on the selection registration process is the selector, processing proceeds to step S115. The controller 200 determines whether the selection registration process is a registration process having the number of print copies above the predetermined value. In other words, the controller 200 determines whether the selection registration process is a registration process having a larger number of print copies.

If the controller 200 determines in step S115 that the selection registration process is a registration process having the number of print copies not above the predetermined value (the registration process having a smaller number of print copies), processing proceeds to step S104. The controller 200 registers the operator operation and the selection registration process in association with each other.

On the other hand, if the controller 200 determines in step S114 that the association destination of the information on the selection registration process is not the selector, in other words, if the controller 200 determines that the association destination of the information on the selection registration process is a third person other than the selector, proceeding proceeds to step S116.

Even if the association destination of the information on the selection registration process is the selector, the controller 200 may determine in step S115 that the selection registration process is a registration process having the number of print copies above the predetermined value. In such a case, processing proceeds to step S116.

Information on the number of execution times of the registration process (information on the number of print copies or information on execution results) is associated with a particular person, and a fee may be charged to the particular person.

The fact that the association destination is different from the selector means that a person other than a person who may be actually billed for the fee selects a registration process and associates the operator operation with the registration process.

According to the exemplary embodiment, if a person other than a person who is actually billed for the fee associates the operator operation with the selection registration process, the association operation is not made in step S104, and processing proceeds to step S116 and subsequent steps.

On the other hand, if a person who is actually billed for the fee associates the operator operation with the selection registration process, the person who is actually billed for the fee performs the association operation, and thus performs the operation in step S104.

In step S116, the controller 200 determines whether the setting not to associate the operator operation with the selection registration process is configured. If the setting is configured, the controller 200 does not associate the operator operation with the selection registration process (step S117).

In other words, the controller 200 does not perform the selection registration process in response to the operator operation by not associating the operator operation with the selection registration process in step S117.

According to the exemplary embodiment, the contents of the final process concerning the association between the operator operation and the selection registration process is configured in advance.

If the setting not to associate the operator operation with the registration process is configured in advance, the controller 200 does not associate the operator operation with the selection registration process as described above.

On the other hand in step S116, if the controller 200 determines that the setting not to associate the operator operation with the registration process is not configured, processing proceeds to step S118.

In step S118, the controller 200 modifies the registration process to the confirmation-type registration process, and then determines whether the setting to register has been configured. In other words, the controller 200 determines whether the setting to associate the operator operation with the selection registration process after the modification to the confirmation-type registration process has been configured.

If the setting to associate the operator operation with the selection registration process after the modification to the confirmation-type registration process has been configured, the controller 200 modifies the selection registration process to the confirmation-type registration process and registers the operator operation the selection registration process in association with each other (step S119).

In other words, after modifying the selection registration process as the immediate-type registration process to the confirmation-type registration process, the controller 200 registers the operator operation and the selection registration process in association with each other.

When the registration process is performed with the operator operation detected, the controller 200 first performs a notification operation to notify of the process contents of the registration process. Specifically, the controller 200 uses the display 410 (see FIG. 1) to perform the notification operation of the process contents of the registration process.

If a reply is returned from the operator (responder), the controller 200 performs the registration process.

It will be noted that the registration process to be executed later in response to an operator operation is at first an immediate-type selection registration process, and the entire registration process is completed by simply setting the original document on the original document transporting device 190.

However, if the registration process is modified to the confirmation-type registration process and then registered as described above, a particular process, such as the notification operation of the process contents, is performed, and is then followed by the registration process.

In step S118, if the controller 200 determines that the setting to register after the modification to the confirmation-type registration process has not been configured, processing proceeds to step S120.

In step S120, the controller 200 determines whether the setting to perform the notification operation when the selection registration process is registered in response to the operator operation (when the operator operation and the selection registration process are registered in association with each other) has been configured.

In step S120, if the controller 200 determines that the setting to perform the notification operation has been configured, the controller 200 notifies the operator via the display 410 that the operator operation and the selection registration process are to be registered in association with each other (step S121). The controller 200 then registers the operator operation and the selection registration process in association with each other (step S121).

In this case, the controller 200 desirably notifies of the contents of the selection registration process.

On the other hand, if the controller 200 determines in step S120 that the setting to perform the notification operation has not been configured, processing proceeds to step S122.

In step S122, the controller 200 turns on a flat to give a warning during the execution of the registration process (notification operation). In other words, the controller 200 associates the selection registration process with information indicating the warning (notification operation) in the execution of the registration process.

The controller 200 registers the operator operation and the selection registration process in association with each other (step S123).

Figure 8:
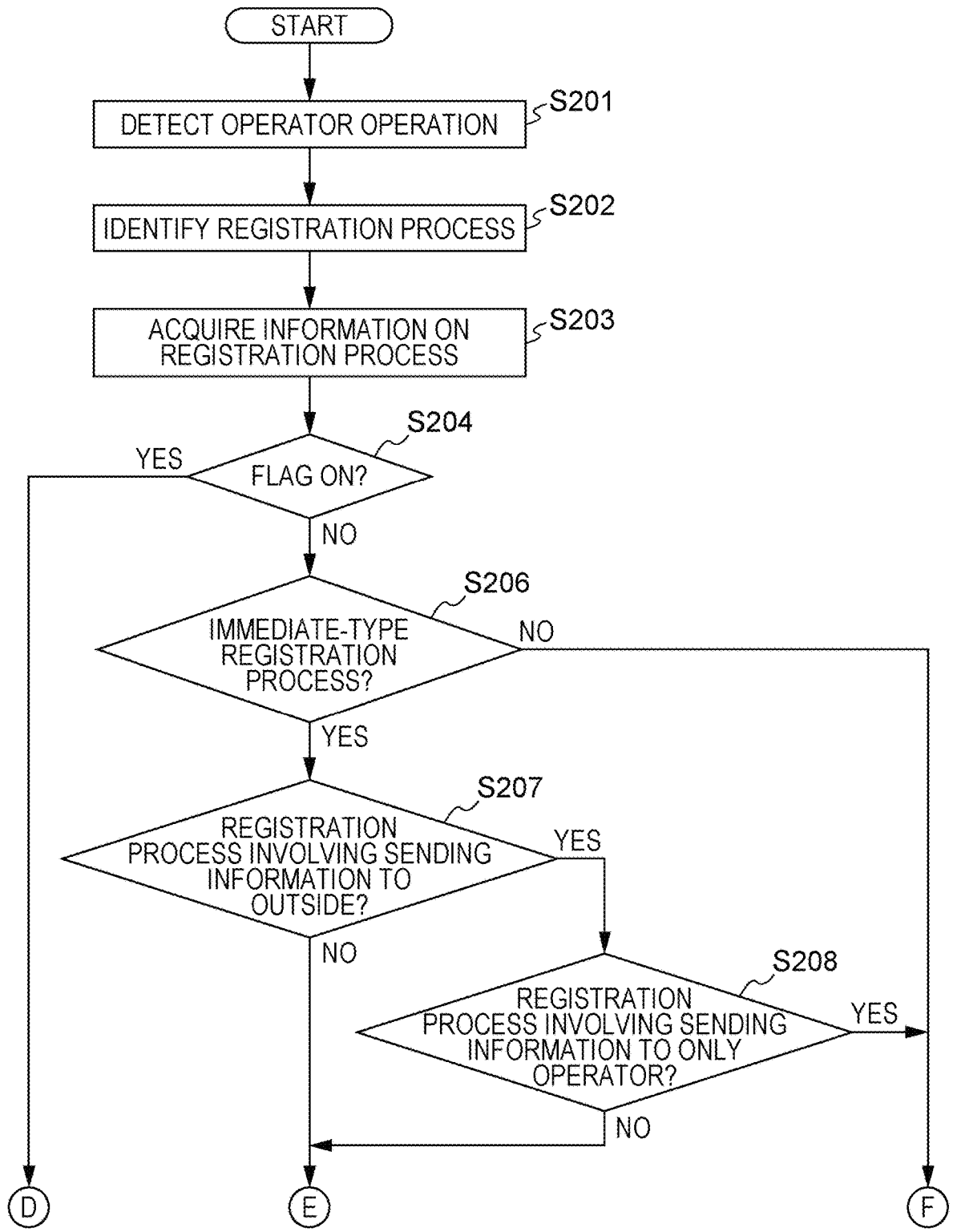
FIG. 8 is a flowchart illustrating a process that is performed when an operator operation is detected.
Figure 9:
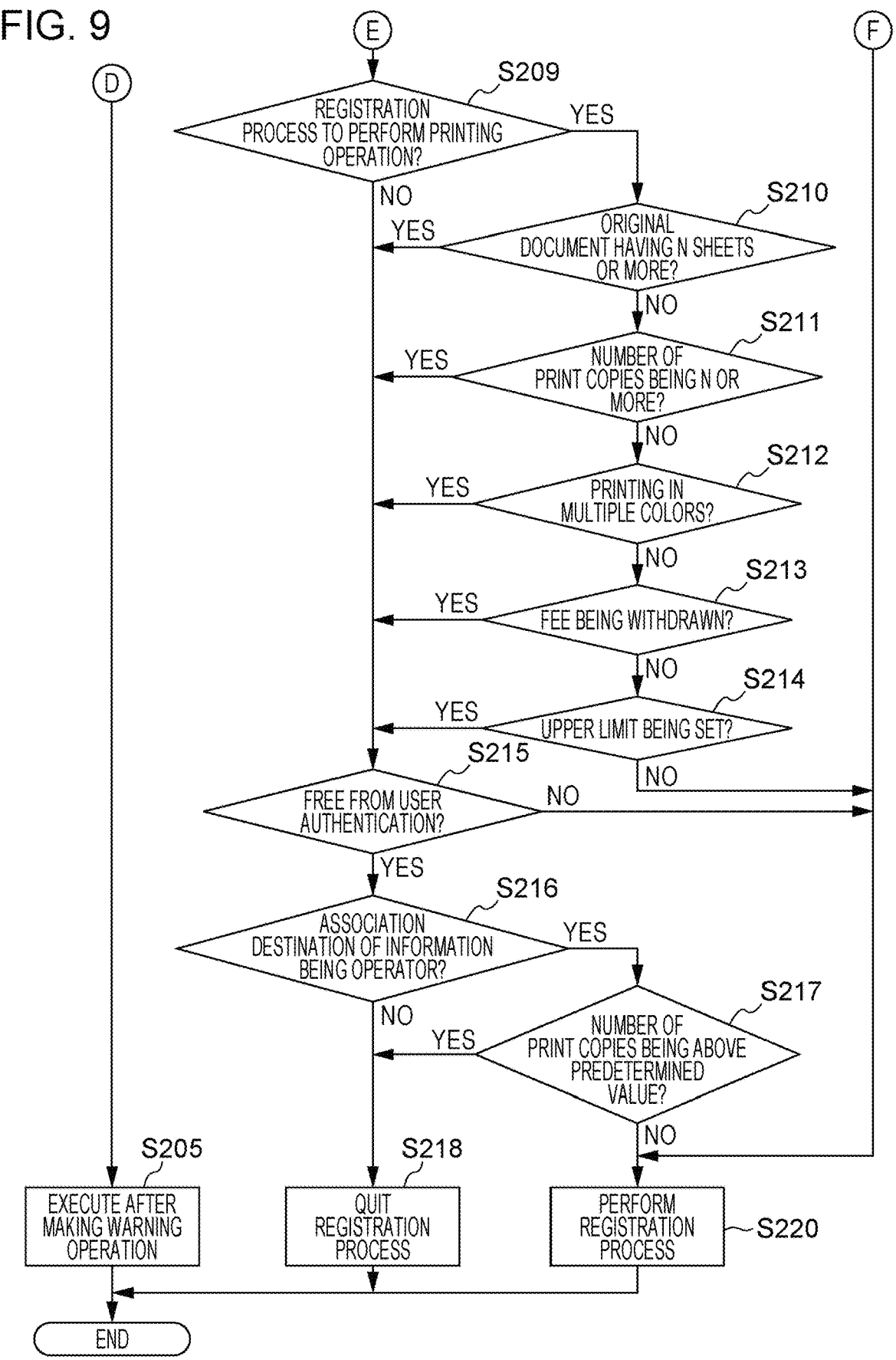
FIG. 9 is the flowchart illustrating the process that is performed when the operator operation is detected.

FIGS. 8 and 9 are flowcharts illustrating a process performed when an operator operation is detected after the execution of operations in steps S101 through S123.

When the operator operation is detected (step S201), the controller 200 searches for and identifies the registration process associated with the operator operation (step S202).

The registration process not associated with the operator operation with the operation performed in step S117 is not identified in step S202.

In step S203, the controller 200 acquires information on an identified registration process (hereinafter referred to as a "particular registration process").

The controller 200 determines whether the flag is turned on (step S204). If the flag is turned on, the controller 200 performs a warning operation, and then performs the registration process (step S205).

Instead of performing the particular registration process simply, the controller 200 performs the particular registration process after performing the warning operation as an example of the particular process.

Specifically, the controller 200 notifies of (displays) the process contents of the particular registration process on the display 410, and then performs the particular registration process.

If the controller 200 determines in step S204 that the flag is not turned on, the controller 200 determines whether the particular registration process is an immediate-type registration process (step S206).

In step S206, the controller 200 determines that the particular registration process is not an immediate-type registration process, the controller 200 performs the particular registration process (step S220).

Specifically, the registration process is a confirmation-type registration process, and the controller 200 performs to the operator the notification operation of the process contents of the particular registration process. If a reply is returned from the operator (responder), the controller 200 performs the particular registration process.

According to the exemplary embodiment, the registration process previously being the immediate-type registration process may be registered as a confirmation-type registration process through steps S118 and S119. In such a case, the registration process previously being the immediate-type registration process (hereinafter referred to as a "type-modified registration process") is performed in step S220.

In such a case, the type-modified registration process is not performed in the original process contents (the registration process, if it is the immediate-type registration process, is not performed in the original process contents), but is performed after the particular process is performed thereon.

Specifically, the notification operation of the process contents to the operator is performed, and the registration process is performed after a reply is returned from the operator (responder).

If the particular registration process is a type-modified registration process when the particular registration process is performed in step S220, the type-modified registration process may be performed without any reply from the operator (responder).

In other words, even if no reply is returned from the responder, the particular registration process (the type-modified registration process) may be performed after a predetermined time has elapsed.

Specifically, if the particular registration process to be performed in step S220 is a type-modified registration process, the type-modified registration process may be performed after the elapse of the predetermined time (3 seconds, for example) even if no reply is returned from the responder.

In such a case, the execution of a process not intended by the operator may be restricted while a drop in user-friendliness is controlled.

The type-modified registration process is originally configured as a registration process that the operator may wish to start immediately in response to the operator operation.

If the registration process is performed without any reply from the responder, the process may be more quickly performed as the operator desires than when the registration process is not performed without receiving any reply from the responder.

According to the exemplary embodiment, the notification operation of the process contents is performed. The execution of the process not desired by the operator may thus be more controlled than when the notification operation is not performed.

If the particular registration process is determined to be an immediate-type registration process in step S206, the controller 200 performs operations in steps S207 through S217.

The operations in steps S207 through S217 except for a part thereof are respectively identical to the operations in steps S105 through S115.

A difference between the operations in steps S207 through S217 and the operations in steps S105 through S115 is described below.

In step S106, the controller 200 determines whether the destination of the information to be sent in the selection registration process is only the selector who has selected the selection registration process in step S101.

In contrast, in step S208, the controller 200 determines whether the destination of the information to be sent in the particular registration process is only the operator who has performed the operator operation detected in step S201.

The operator who has performed the operator operation is identified, based on information read from an ID card that the operator has held over the image forming apparatus 1 or a password (user code) that the operator has entered onto the image forming apparatus 1.

In other words, the operator who has performed the operator operation is identified, based on information acquired in the user authentication performed prior to the operator operation.

In step S113, the controller 200 determines whether the selection registration process is a registration process free from the user authentication in the execution of the selection registration process (the authentication-free registration process).

In contrast, in step S215, the controller 200 determines whether the particular registration process is a registration process free from the user authentication in the execution of the particular registration process (the authentication-free registration process).

If the particular registration process is an authentication-free registration process, processing proceeds to step S216 and subsequent steps.

On the other hand, if the particular registration process is not an authentication-free registration process, the controller 200 performs the particular registration process in step S220 on condition that the user authentication has been successfully performed.

In step S114, the controller 200 determines whether the association destination of the information on the selection registration process is the selector who has selected the selection registration process in step S101.

In contrast, in step S216, the controller 200 determines whether the association destination of the information on the particular registration process is the operator who has performed the operator operation detected in step S201.

In the operations in steps S207 through S217 (respectively identical to the operations in steps S105 through S115), the controller 200 virtually determines whether the particular registration process (the selection registration process) is a registration process that is less susceptible to a fault even if the operator has unintentionally performed the particular registration process.

If the controller 200 determines that the particular registration process is a registration process less susceptible to a fault, the controller 200 proceeds to step S220 to perform the registration process.

Specifically, the process to be performed in step S220 includes the registration process with the destination of the information being the operator himself or herself, the registration process satisfying the particular print condition (such as the registration process having a smaller number of print copies), the registration process that is not performed if the user authentication is not performed, or the registration process with the association destination of the information related to the process count being the operator himself or herself.

On the other hand, in the operations in steps S207 through S217 (respectively identical to the operations in steps S105 through S115), if the controller 200 determines that the particular registration process is a registration process that is more susceptible to a fault, the controller 200 suspends the execution of the registration process (step S218). In other words, the controller 200 restricts the execution of the registration process, thereby not performing the registration process.

It will be noted that the controller 200 suspends the execution of the registration process after sending a predetermined notice to the operator.

The example of the process of the image forming apparatus 1 has been described. The process is also applicable to a facsimile device that transmits or receives an image.

If the operator operation is special and less likely to be used in normal operation (if the operator operation is an operation that satisfies a predetermined specific operation), the above-described process may not be performed (for example, neither the operation of not associating the operator operation with the registration process nor the operation of restricting the execution of the registration process is performed), the operator operation is associated with the registration process, and the registration process is simply performed if the operator operation is detected.

For example, an operator operation of repeatedly setting an original document on the image reading device 100 in a short period of time (an operation of the original document sensor S1 that repeatedly detects the original document in a short period of time) is not typically performed.

In such a case, the above process (the operation of repeatedly setting the original document) is not performed in response to the operator operation. The operator operation is associated with the registration process, and if the operator operation is detected, the registration process is simply performed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. A processing system comprising:
a detecting unit that detects an operator operation to set a recording medium onto an image processing apparatus or to move part of the image processing apparatus wherein the operator operation is an operation performed by an operator; and a controller that registers a registration processes and performs, in response to detected operator operation, a registration process among registration processes registered in advance wherein if one or more of the registration processes satisfy a predetermined condition, the controller registers the one or more of the registration processes which are changed not to perform in response to the operator operation or to perform the one or more of the registration processes after performing a particular process, wherein the controller performs the one of more of the registration processes after performing a notification operation to notify of contents of the one of more of the registration processes.

2. The processing system according to claim 1, wherein the controller does not perform the one or more of the registration processes in response to the operator operation by not associating the operator operation with the one or more of the registration processes.

3. The processing system according to claim 1, wherein the controller does not perform the one or more of the registration processes in response to the operator operation by restricting execution of the one or more of the registration processes.

4. The processing system according to claim 1, wherein the controller does not perform in response to the operator operation a registration process involving sending information to outside.

5. The processing system according to claim 4, wherein the controller performs in response to the operator operation a registration process involving sending the information to an operator who operates the image processing apparatus, as part of the registration process involving sending the information to outside.

6. The processing system according to claim 1, wherein the controller does not perform in response to the operator operation a registration process that performs a printing operation and satisfies a predetermined condition.

7. The processing system according to claim 6, wherein the controller does not perform in response to the operator operation the registration process that performs the printing operation for a number of print copies exceeding a predetermined value.

8. The processing system according to claim 6, wherein the controller does not perform in response to the operator operation the registration process that performs the printing operation for printing in a plurality of colors.

9. The processing system according to claim 1, wherein the controller performs the one of more of the registration processes if a reply is returned from a responder after performing the notification operation to notify of the contents of the one of more of the registration processes.

10. The processing system according to claim 9, wherein even if no reply is returned from the responder, the controller performs the one of more of the registration processes after a predetermined time has elapsed.

11. The processing system according to claim 1, wherein the controller does not perform in response to the operator operation the registration process if an association destination of information related to execution results of the registration process is other than the operator who operates the image processing apparatus.

12. The processing system according to claim 1, wherein the controller does not perform in response to the operator operation the registration process that is executable without performing user authentication.

13. A non-transitory computer readable medium storing a program causing a computer to execute a process for processing information, the process comprising:

detecting an operator operation that is performed by an operator to set a recording medium onto an image processing apparatus or an operator operation to move part of the image processing apparatus;

performing in response to the detected operator operation a registration process among registration processes registered in advance; and not performing one of more of the registration processes in response to the operator operation or performing the one of more of the registration processes after performing a notification operation to notify of contents of the one of more of the registration processes.

* * * * *